(No Model.)

N. J. TANNER.
ANIMAL TRAP.

No. 515,263.　　　　　　　　　　Patented Feb. 20, 1894.

WITNESSES:　　　　　　　　　　INVENTOR
Paul Johot　　　　　　　　　　N. J. Tanner
C. Sedgwick　　　　　　　　　BY Munn & Co
　　　　　　　　　　　　　　　ATTORNEYS.

UNITED STATES PATENT OFFICE.

NEWTON J. TANNER, OF OVIEDO, FLORIDA, ASSIGNOR TO HIMSELF AND JAMES H. LEE, OF SAME PLACE.

ANIMAL-TRAP.

SPECIFICATION forming part of Letters Patent No. 515,263, dated February 20, 1894.

Application filed July 5, 1893. Serial No. 479,605. (No model.)

*To all whom it may concern:*

Be it known that I, NEWTON J. TANNER, of Oviedo, in the county of Orange and State of Florida, have invented a new and Improved Animal-Trap, of which the following is a full, clear, and exact description.

My invention relates to improvements in what are known as steel traps such as are used for catching small animals. As usually constructed these traps when sprung have a tendency to throw out the foot of the animal springing them, and as the animal naturally jumps at the same time, he frequently escapes.

The object of my invention is to produce a trap which when sprung, will jump bodily upward, thus raising the jaws so as to make sure that the jaws catch on the leg of the animal springing the trap, and also to provide a series of hooks which extend outward beyond the free ends of the jaws and overlap, so that if by any possible chance the animal should escape the jaws when they spring together, the hooks would catch him by the body and hold him fast.

To these ends my invention consists of certain features of construction and combinations of parts, as will be hereinafter described and claimed.

Reference is to be had to the accompanying drawings forming a part of this specification, in which similar figures of reference indicate corresponding parts in both the views.

Figure 1:
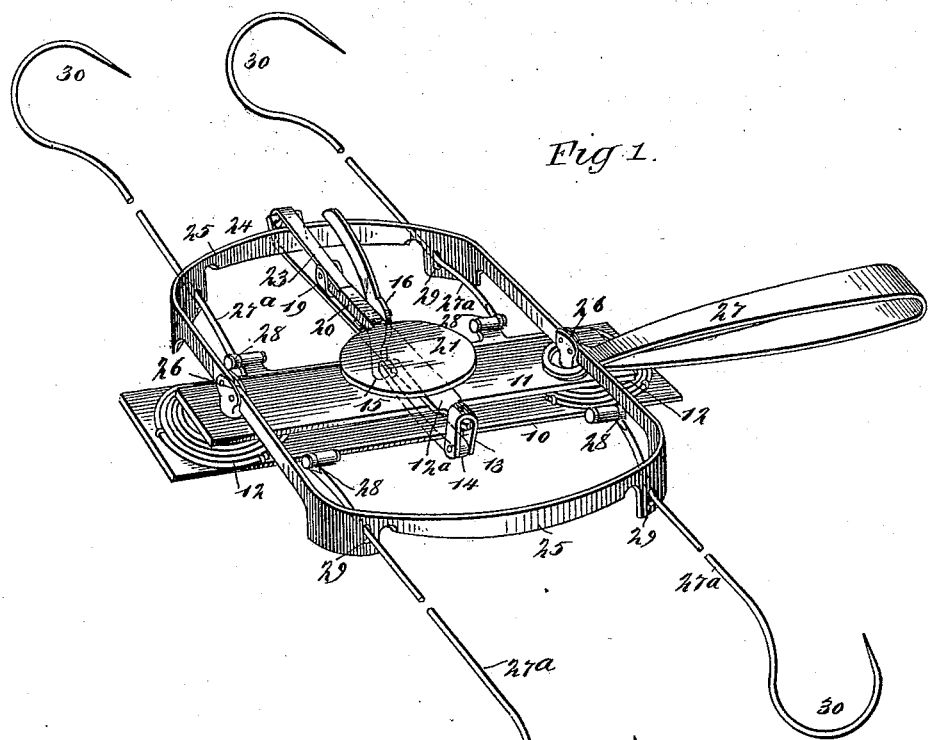
Figure 2:
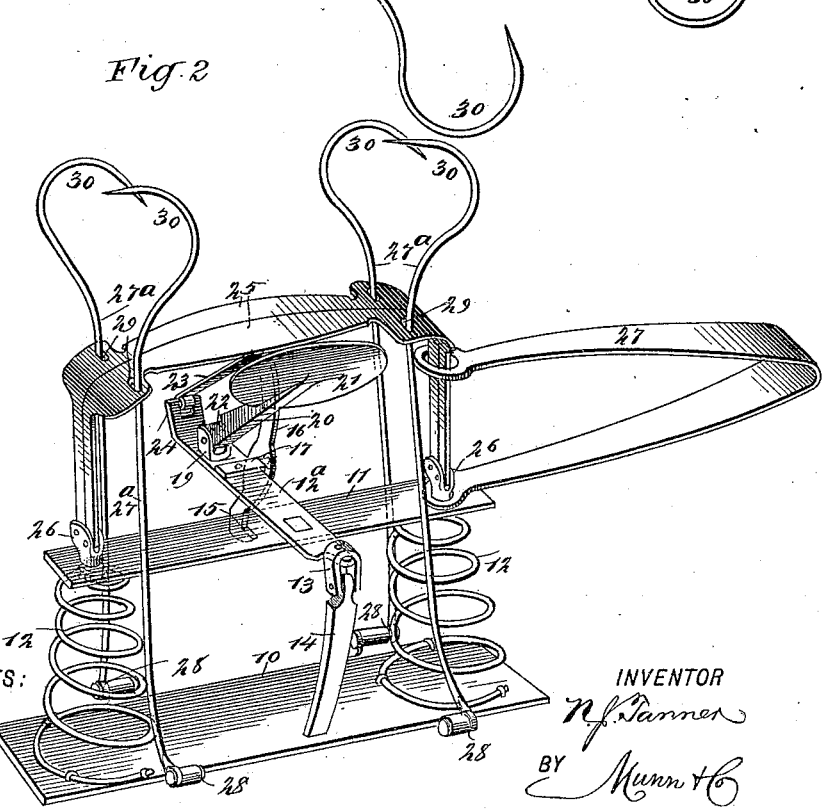

Figure 1 is a broken perspective view of the trap, showing it set; and Fig. 2 is a perspective view of the trap after it is sprung.

The trap is provided with a base plate 10 and above and parallel with this is a second plate 11 which supports the trap proper, and the two plates are connected by springs 12 which are arranged near the ends of the plates and which are compressed and fastened down, as in Fig. 1, when the trap is set, but which spring upward and raise the trap bodily when it is sprung, all as hereinafter described. The plate 11 has secured to its upper side a cross bar $12^a$, which at one end carries a depending clip 13 to which is pivoted a locking arm 14, which arm when the plate 11 is depressed is adapted to be doubled beneath the plate 10 and fastened in a horizontal position, as shown in Fig. 1, to hold the two plates 10 and 11 together. The free end of the arm 14 is engaged by a hook 15 on the end of a tripping lever 16, which is fulcrumed on the cross bar $12^a$, as shown at 17, and the upper end of which extends into the path of one of the jaws of the trap, as hereinafter described, so that when the trap is sprung, the lever is tilted and the arm 14 released.

The cross bar $12^a$ has secured to it, near one end, a clip or lug 19 to which is pivoted the shank 20 of the tripping plate 21 on which the animal steps to spring the trap, and this shank 20 has a shoulder 22 to engage the locking arm 23, which is pivoted to the turned up end 24 of the cross bar and which is adapted to lie across one of the jaws 25 in the usual way, and, by engaging the shoulder 22, hold the jaw down and the plate 21 up. When, however, the plate is stepped on, the depression of the plate 21 releases the arm 23 and permits the jaws 25 to close. The jaws 25 are substantially of the usual kind, each being of a substantially U-shape, and they are pivoted at their ends in clips 26 which are attached to the plate 11.

The trap has the usual leaf spring 27, the ends of which slide on the adjacent jaw members so as to normally press the jaws together. The trap is also provided with rods $27^a$ which are arranged in pairs at each end, and these rods are hinged to the base plate 10 at the bottom, as shown at 28, and they extend through guide slots 29 in the jaws 25 so as to open and close with the jaws; their upper ends terminate in oppositely arranged hooks 30, the points of which overlap when the jaws are closed, so that the hooks are pressed firmly into the body of any animal which may be caught in the trap.

The trap is set by compressing the spring 27 and opening the jaws, throwing the arm 23 over one of the jaws 25 into engagement with the shoulder 22 of the shank 20, and at the same time compressing the springs 12, swinging the arm 14 beneath the base plate 10, and throwing the hook 15 into engagement with the free end of the arm. This brings the upper end of the lever 16 into the path of one of the jaws, as shown clearly in Fig. 1. When an animal steps on the plate 21, it releases the arm 23 and jaws 25, which immediately close in the usual way and as soon as they start one jaw strikes and trips the lever 16 so as to release the hook 15 and arm 16, and the springs 12 lift the entire trap, with the exception of the base plate 10 and rods 27ª, upward so that the trap is sure to catch the animal either between the jaws 25 or between the hooks 30.

I do not limit myself to the precise arrangement of springs for raising the trap bodily, or to the particular mechanism which releases the springs and permits them to act.

Having thus described my invention, I claim as new and desire to secure by Letters Patent—

1. A steel trap having its spring actuated jaws pivoted upon a spring pressed plate, which is released from a support and rises bodily when the trap is sprung, substantially as and for the purpose set forth.

2. In a steel trap, the combination of a vertically movable and spring pressed plate upon which the usual spring actuated jaws are pivoted, a jaw locking and tripping mechanism, and means for releasing the plate when the trap is sprung, to allow the plate with its jaws to rise bodily substantially as described.

3. The combination, with a steel trap, of springs arranged beneath the trap and adapted to lift it bodily, locking mechanism for holding the trap down and the springs compressed, and means for releasing the locking mechanism by the springing of the trap, substantially as described.

4. In a steel trap, the combination with a support and pivoted and spring actuated jaws carried by the support, of springs arranged beneath the support, means for holding the jaws open and the springs under the support compressed, and a spring releasing mechanism operated by the springing of the trap, substantially as described.

5. The combination, with a steel trap having the usual jaws a locking and tripping mechanism and a plate beneath the jaws, of a base plate, springs between the base plate and the jaw supporting plate, a locking arm supported above the base plate and adapted to swing beneath the base plate, and a tripping lever supported above the base plate, said lever having one end formed into a hook to engage the locking arm and the other adapted to extend into the path of one of the open jaws, substantially as described.

6. In a steel trap, the combination with a base plate and pivoted and spring actuated jaws, of hooks pivoted to the base plate and projecting through apertures in the jaws, substantially as described.

7. The combination, with the trap having the usual swinging jaws and a supporting plate for the jaws, of a base plate arranged beneath the supporting plate, springs between the base plate and supporting plate adapted to lift the trap bodily, a locking device to hold the springs in a compressed position, means for releasing the springs by the springing of the trap, and a plurality of hooks hinged to the base plate and carried by and projecting beyond the free edges of the jaws, substantially as described.

NEWTON J. TANNER.

Witnesses:
W. H. NALL,
NAT. POYNTZ.